Feb. 2, 1965 W. C. McCARTHY 3,168,585
SEPARATION OF A DISPERSED LIQUID HYDROCARBON
PHASE FROM AN IMMISCIBLE LIQUID PHASE
Filed May 26, 1961
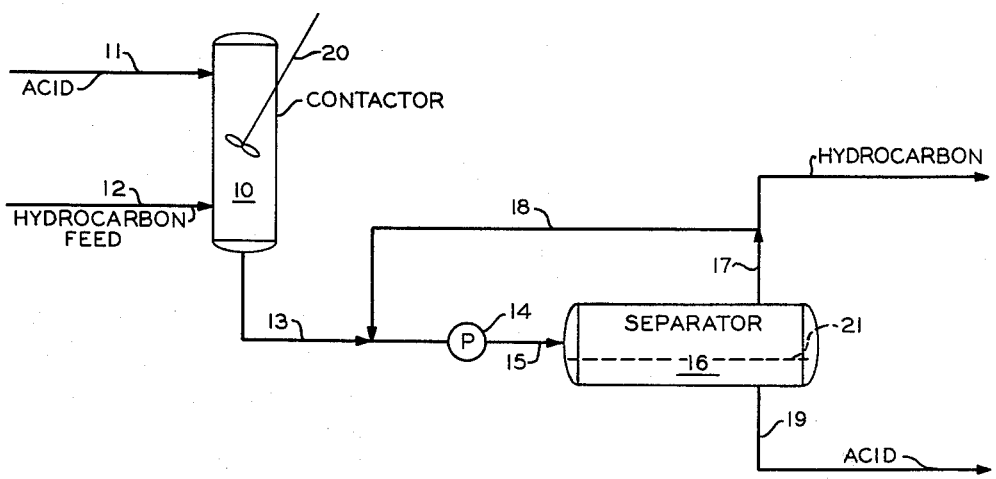
INVENTOR.
W. C. MC CARTHY
BY
ATTORNEYS United States Patent Office 3,168,585
Patented Feb. 2, 1965

3,168,585
SEPARATION OF A DISPERSED LIQUID HYDRO-
CARBON PHASE FROM AN IMMISCIBLE LIQUID
PHASE
William C. McCarthy, Bartlesville, Okla., assignor
to Phillips Petroleum Company, a corporation of
Delaware
Filed May 26, 1961, Ser. No. 112,920
6 Claims. (Cl. 260—677)

This invention relates to the separation of immiscible liquids. In one specific aspect, this invention relates to the separation of a liquid hydrocarbon from an immiscible solvent. In another specific aspect, this invention relates to the separation of a mixture of hydrocarbons from a sulfuric acid solution containing absorbed tertiary amylenes.

Liquid solvents generally immiscible with liquid hydrocarbons are conventionally employed to extract, by absorption, specific hydrocarbon constituents from hydrocarbon mixtures. Intimate contact between the hydrocarbon and solvent phases is effected during the extraction step. After the extraction step is completed, it is necessary to separate the immiscible phases. Conventionally, this is accomplished by passing a mixture of the hydrocarbon and solvent phases to a settling vessel wherein the phases are permitted to separate by reason of the difference in the density of each immiscible phase. It is difficult, and under some conditions almost impossible, to effectively separate the phases within a reasonable settling time. This is to say that in a conventional liquid phase separation step the solvent phase withdrawn from the settling zone will contain a portion of the hydrocarbon phase dispersed throughout at least a portion of the solvent phase.

In the extraction of tertiary amylenes from a mixture of hydrocarbons containing said tertiary amylenes and other $C_5$ hydrocarbons, said mixture of hydrocarbons is intimately contacted with an aqueous sulfuric acid solution. It is then necessary to separate the hydrocarbon phase from the acid phase containing absorbed tertiary amylenes. Conventionally, this is accomplished by passing the hydrocarbon and acid mixture to a settling vessel wherein the sulfuric acid solution containing absorbed tertiary amylenes settles into the lower region of the settling vessel and is withdrawn therefrom. It has been determined that the extraction of tertiary amylenes from the hydrocarbon mixture, using sulfuric acid as the extracting agent, is effective when the concentration of a 50–70 weight percent sulfuric acid in the contact zone is in the range of 40–70 volume percent. Under these conditions, the hydrocarbon and acid mixture passed from the contact zone to the settling zone consists of a dispersed hydrocarbon, or non-polar phase, in a continuous sulfuric acid, or polar phase.

Upon withdrawal of the sulfuric acid phase from the settling zone, it has been observed that a portion of the hydrocarbon phase is dispersed throughout at least a portion of the sulfuric acid phase in the form of a fog. This dispersed hydrocarbon reduces the purity of the tertiary amylenes subsequently recovered from the sulfuric acid phase.

Accordingly, an object of this invention is to provide an improved process for the separation of immiscible liquids wherein at least one of said immiscible liquids is a hydrocarbon.

Another object of this invention is to provide an improved method of separating an immiscible dispersed liquid hydrocarbon phase from a mixture containing said liquid hydrocarbon phase and a sulfuric acid phase.

Other objects, advantages, and features of my invention will be readily apparent to those skilled in the art from the following description and the appended claims.

Broadly, I have discovered that a dispersed liquid hydrocarbon phase is effectively separated in a settling zone from a mixture containing said dispersed liquid hydrocarbon phase and a continuous liquid phase immiscible with said hydrocarbon phase, by intimately contacting said mixture with a portion of the hydrocarbon phase withdrawn from said settling zone prior to passing said mixture to said settling zone so that the hydrocarbon phase becomes the continuous phase.

The inventive process is applicable to the separation of a hydrocarbon phase from a mixture of two immiscible liquid phases wherein the hydrocarbon phase is the dispersed phase. The immiscible phase other than the hydrocarbon phase can be an inorganic or organic solvent. The inventive process is particularly effective when a non-polar hydrocarbon is dispersed in a polar continuous immiscible phase.

The inventive process is applicable to the separation of a hydrocarbon phase from a mixture of two immiscible liquid phases wherein the density of the hydrocarbon phase is greater than or less than the density of the other immiscible liquid phase.

A better understanding of the inventive process is obtained by referring to the specific process of absorbing tertiary amylenes from a hydrocarbon mixture containing said tertiary amylenes and other $C_5$ hydrocarbons.

The drawing is a schematic representation of the inventive process.

Referring to the drawing, a hydrocarbon mixture containing tertiary amylenes and other $C_5$ hydrocarbons is passed to a contactor 10 via conduit 12. Aqueous sulfuric acid having an acid concentration in the range of 50–70 weight percent is passed to contactor 10 via conduit 11. Within contactor 10, the sulfuric acid and hydrocarbon mixture is admixed by a conventional mixing or agitating means 20. The temperature of the contact zone is maintained below 100° F. by a means, not herein illustrated, such as controlling the temperature of the hydrocarbon and acid feed streams. Sulfuric acid and hydrocarbon feeds are passed to contactor 10 at rates so as to maintain a volume percent of sulfuric acid in contactor 10 within the range of 40–70.

A hydrocarbon and sulfuric acid mixture is withdrawn from contactor 10 via conduit 13. Within conduit 13, said withdrawn hydrocarbon and sulfuric acid mixture is contacted with a liquid hydrocarbon recycled from the upper region of separation vessel 16 via conduit 17 and conduit 18. The combined mixture is passed to a mixing means such as a pump 14, whereby the recycled liquid hydrocarbon is intimately admixed with the hydrocarbon and sulfuric acid mixture withdrawn from contactor 10. The thoroughly mixed, combined liquid phases are passed via conduit 15 to a separation vessel 16.

Liquid hydrocarbon is recycled via conduit 18 to conduit 13 at a rate sufficient to maintain the volume percent of sulfuric acid in the combined stream passed to separation vessel 16 via conduit 15 below 30 percent.

Within separation vessel 16 the feed mixture separates into two liquid phases having an interface 21. A hydrocarbon phase is withdrawn from the upper region of vessel 16 via conduit 17 with a portion of said withdrawn liquid hydrocarbon recycled to conduit 13 via conduit 18. The sulfuric acid phase containing absorbed tertiary amylenes is withdrawn from the lower region of separation vessel 16 via conduit 19.

The following example is presented as illustrative of the effectiveness of the inventive process.

EXAMPLE

Four runs were made to demonstrate the effectiveness of the inventive process. In runs 1 and 3, the mixture passed to the settling zone was contacted with a recycle hydrocarbon phase in the inventive manner. Runs 2 and 4 were made without contacting the feed mixture to the settling zone with a recycle hydrocarbon phase.

A hydrocarbon feed mixture containing tertiary amylenes and other $C_5$ hydrocarbons was passed to a stirred contact zone at the rate illustrated in Table I. An aqueous sulfuric acid having an acid concentration of 60 weight percent was passed to the stirred contact zone at the rate illustrated in Table I. The temperature of the contact zone was maintained at 60° F. A mixture of hydrocarbon and sulfuric acid phases with the volume percent acid phase shown in Table I was passed from the contact zone to a settling zone. In the case of runs 1 and 3, the volume was increased by adding a hydrocarbon recycle phase to the mixture withdrawn from the contact zone and the combined mixture thoroughly mixed.

The combined mixture passed to the settling zone was permitted to settle into two liquid phases. The settling zone was maintained at a temperature of 60° F. and a pressure of 10 p.s.i.g. After an average residence time in the settling zone shown in Table I, the acid phase was withdrawn. The tertiary amylenes absorbed in the acid phase were then recovered by contacting the acid phase with heptane. The tertiary amylenes were recovered from the heptane solvent by distillation and were found to have the percent purity shown in Table I. The purity of the recovered tertiary amylenes is the percent of the $C_5$ hydrocarbon fraction separated from the heptane solvent consisting of tertiary amylenes.

Table I

| Run | Feed to Contact Zone (lbs./hr.) | | Volume Percent Acid in Feed to Settling Zone | Residence Time in Settling Zone (Minutes) | Tertiary Amylene, Volume Percent Purity |
|---|---|---|---|---|---|
| | Hydrocarbon | Sulfuric Acid | | | |
| 1 | 67.0 | 50.0 | 14.0 | 23 | 95 |
| 2 | 67.0 | 50.0 | 35.0 | 23 | 70 |
| 3 | 45.6 | 67.0 | 18.0 | 17 | 95 |
| 4 | 45.6 | 67.0 | 50.0 | 17 | 73 |

The tertiary amylenes recovered in runs 2 and 4 contained other $C_5$ hydrocarbons, conclusively demonstrating the reduced effectiveness of a conventional settling zone. Runs 1 and 3 demonstrate the effectiveness of the inventive process of recycling a portion of the hydrocarbon phase from the settling zone and admixing this recycle hydrocarbon phase with the mixture passed to the settling zone.

As will be evident to those skilled in the art, various modifications of this invention can be made, or followed, in the light of the foregoing disclosure and discussion without departing from the spirit or scope thereof.

I claim:

1. A process of separating a dispersed liquid hydrocarbon phase from an immiscible liquid phase which comprises contacting in a contact zone a mixture of said dispersed hydrocarbon and immiscible liquid phases with a portion of said liquid hydrocarbon withdrawn from a separation zone sufficient to produce a second mixture comprised of said immiscible liquid phase dispersed in a hydrocarbon phase, passing said second mixture from said contact zone to said separation zone, withdrawing from said separation zone said liquid hydrocarbon, and withdrawing from said separation zone a liquid phase immiscible with said liquid hydrocarbon.

2. A process of separating a dispersed non-polar liquid hydrocarbon phase from an immiscible polar liquid phase which comprises contacting in a contact zone a mixture of said dispersed non-polar hydrocarbon and immiscible polar liquid phases with a portion of said liquid hydrocarbon withdrawn from a separation zone sufficient to produce a second mixture comprised of said immiscible liquid phase dispersed in a hydrocarbon phase, passing said second mixture from said contact zone to said separation zone, withdrawing from said separation zone said liquid hydrocarbon, and withdrawing from said separation zone a liquid phase immiscible with said liquid hydrocarbon.

3. A process of separating a dispersed liquid hydrocarbon phase from an immiscible sulfuric acid phase which comprises contacting in a contact zone a mixture of said immiscible hydrocarbon and sulfuric acid phases with a portion of said liquid hydrocarbon withdrawn from a separation zone sufficient to produce a second mixture comprised of said sulfuric acid phase dispersed in an immiscible hydrocarbon phase, passing said second mixture from said contact zone to said separation zone, withdrawing from said separation zone said liquid hydrocarbon, and withdrawing from said separation zone a sulfuric acid phase immiscible with said liquid hydrocarbon.

4. The process of claim 3 wherein said dispersed liquid hydrocarbon phase is comprised of $C_5$ hydrocarbons and said sulfuric acid phase contains absorbed tertiary amylenes.

5. A process of separating tertiary amylenes from a hydrocarbon mixture containing said tertiary amylenes and other $C_5$ hydrocarbons which comprises contacting said mixture with an aqueous sulfuric acid in an absorption zone, said aqueous sulfuric acid having an acid concentration in the range of 50–70 weight percent, maintaining the temperature of said absorption zone below 100° F., passing a second mixture comprised of immiscible hydrocarbon and sulfuric acid phases from said absorption zone to a contact zone, contacting said second mixture in said contact zone with a portion of said immiscible liquid hydrocarbon withdrawn from a separation zone sufficient to produce a third liquid mixture comprised of a sulfuric acid phase dispersed in an immiscible hydrocarbon phase, passing said third mixture from said contact zone to said separation zone, withdrawing from said separation zone said immiscible liquid hydrocarbon, and withdrawing from said separation zone a sulfuric acid phase containing absorbed tertiary amylenes.

6. A process of separating tertiary amylenes from a hydrocarbon mixture containing said tertiary amylenes and other $C_5$ hydrocarbons which comprises contacting said mixture with an aqueous sulfuric acid in an absorption zone, said aqueous sulfuric acid having an acid concentration in the range of 50–70 weight percent, maintaining the temperature of said absorption zone in the range of 20–60° F., passing a second mixture comprised of immiscible hydrocarbon and sulfuric acid phases from said absorption zone to a contact zone, contacting said second mixture in said contact zone with a portion of said immiscible liquid hydrocarbon withdrawn from a separation zone sufficient to produce a third liquid mixture comprised of a sulfuric acid phase dispersed in an immiscible hydrocarbon phase, the concentration of said sulfuric acid phase in said third liquid mixture less than 30 volume percent, passing said third mixture from said contact zone to said separation zone, withdrawing from said separation zone said immiscible liquid hydrocarbon, and withdrawing from said separation zone a sulfuric acid phase containing absorbed tertiary amylenes.

References Cited in the file of this patent

UNITED STATES PATENTS

| 2,509,885 | Rupp et al. | May 30, 1950 |
| 2,958,715 | Sanford et al. | Nov. 1, 1960 |
| 2,968,682 | Crouse et al. | Jan. 17, 1961 |